3,102,783
PROCESS FOR SEPARATING SAMARIUM, EUROPIUM AND YTTERBIUM FROM OTHER RARE EARTHS
Maurice Leon Peltier, Nevilly, and Paul Antoine Rombau, La Rochelle, France, assignors to Societe de Produits Chimiques des Terres Rares, Paris, France, a corporation of France
No Drawing. Filed July 9, 1959, Ser. No. 825,870
Claims priority, application France July 11, 1958
5 Claims. (Cl. 23—24)

The present invention relates to methods for separating at least one of the rare earth elements, samarium, europium and ytterbium from the other members of the group of rare earths with which they are associated.

It is known that samarium, europium and ytterbium can be reduced from the trivalent state to the divalent state. Compounds of these divalent elements are relatively stable in a dry state or in neutral or acid solutions. Moreover, these compounds are stable in a watery ammoniacal medium for several days when maintained under non-oxidizing conditions and, in the presence of ammonia, behave differently than trivalent earths.

The method according to the invention involves reduction of one or more of the elements or compounds of Sm, Eu, Yb present in a mixture of rare earths or their compounds to divalent state and separating these divalent rare earth or rare earths from trivalent rare earths by making use of the difference in their behaviours in the presence of ammonia.

In one method embodying the invention, a mixture of divalent and trivalent rare earth compounds are introduced into an ammonia solution wherein divalent rare earth compounds dissolve and thereby can be separated by filtration or other appropriate method of separating solid and liquid phases from the trivalent rare earths which form insoluble hydroxides in the ammonia solution.

In another method, $SO_4$ ions, for example, ammonium sulfate, are added to the ammoniacal solution containing divalent and trivalent rare earth compounds to produce a precipitate containing insoluble sulfates of the divalent earths and the insoluble hydroxides of the trivalent earths. When the solution is acidified slightly, the hydroxides of the trivalent earths are dissolved and the insoluble sulfate of divalent earth or earths are separated by filtration or in other suitable way.

More particularly, in accordance with the invention, when dissolving the divalent rare earth compounds an excess of ammonia should be used, that is, at least a sufficient quantity should be used in relation to the divalent earths present.

The methods according to the invention can be modified considerably without departing from the invention, depending upon whether it is desired to recover the reducible rare earths or to eliminate them from a mixture in which trivalent rare earths are to be recovered or purified.

In a typical method, a mixture of trivalent rare earth chlorides containing samarium trichloride is subjected to a reducing action to produce samarium dichloride. The mixture of divalent and trivalent chlorides is introduced into an aqueous ammoniacal solution wherein the rare earths remaining in trivalent state are precipitated in the form of hydroxides, while the divalent samarium chloride dissolves. The solution may then be filtered to remove the insoluble hydroxides. After filtration, the filtrate containing the divalent rare earth in solution is treated with an oxidizing agent such as $H_2O_2$ whereby samarium dichloride is oxidized to samarium trichloride and may be recovered as a hydroxide by filtration.

The above treatment is also applicable to the recovery of europium and ytterbium.

In particular, if a raw material containing both samarium and europium is treated as described above, the europium will follow the samarium and will be found with it in the filtrate after separation of the precipitate of rare earths in trivalent state. The europium can subsequently be separated from the samarium by reduction with zinc amalgam and precipitation of europium sulfate.

The following method also may be used to extract divalent rare earths from a mixture of rare earths.

Ammonium sulfate is added to the ammonia solution containing the trivalent and divalent rare earth compounds thereby producing insoluble sulfates of divalent earths and insoluble hydroxides of trivalent rare earths. The trivalent earths can be dissolved by acidifying the solution with hydrochloric acid thereby enabling the divalent rare earth compound or compounds to be removed by filtration or its equivalent in the form of oxychlorides.

The latter method is particularly useful for eliminating from a mixture of rare earths the reducible elements (Sm, Eu, Yb) and for purification, for example, of gadolinium salts and their closely related elements.

Reduction of rare earth to divalent state can also be effected, for example, by only reducing Eu on the Jones column and separating it by the process described.

It is advantageous, in practice, to use a mixture of chlorides of rare earths previously enriched in reducible elements. In this way, consumption of the reagents, handling and the volume to be treated will be lessened and the yield will be improved.

If the raw material is a mixture of cerium earths, the earths of small atomic masses may be eliminated in advance to a considerable extent, for example, by hydrolysis after oxidation to eliminate the cerium, by controlled basic precipitation to eliminate part of the lanthanum and, in some cases, by fractional crystallization.

Methods for reducing samarium, europium and ytterbium elements from trivalent to divalent state are known.

The following are examples of typical methods of reducing samarium, europium and ytterbium to the divalent state.

EXAMPLE I

*Reduction By Igneous Electrolysis (Fusion)*

Five kilograms of anhydrous barium chloride are introduced into a cast iron crucible and heated to fusion by means of an electric arc. A mixture of dehydrated chlorides of rare earths containing about 40% $SmCl_3$ is added in fractions. A direct current of from 500 amperes to 600 amperes, 8 to 10 volts is maintained using a 200 mm. diameter carbon anode.

20 kgs. of the mixed chlorides are introduced into the crucible over a period of about 6 hours after which the molten mass is poured into an ingot mold, cooled and mixed. It must be shielded from humidity.

EXAMPLE II

*Reduction by Sodium Vapor*

Into the lower part of a hollow steel ball 450 grs. of sodium are introduced. A basket containing 2000 grs. of dehydrated chloride of rare earths containing 40% $SmCl_3$ is placed in the ball above the sodium. The air is expelled and the ball is filled with argon, sealed and heated to 500° C. A quick reaction occurs and the temperature is raised to the vicinity of 1000° C.

The ball is allowed to cool and the reduced mass is recovered, mixed and kept protected from humidity.

EXAMPLES OF SEPARATION OF THE DIVALENT RARE EARTHS FROM THE TRIVALENT RARE EARTHS

*Example A.*—Into a closed receptacle are introduced 4 liters of cooled, boiled water, 100 grams ammonium chloride, and 300 ml. of 12 N ammonia. The air is expelled with nitrogen and 1 kg. of a mixture of reduced rare earth chlorides obtained as described above and containing about 20% $SmCl_2$ is introduced into the receptacle rapidly and with agitation. The mass was previously crushed and protected from any oxidation.

A sufficient quantity of ice is also added to prevent appreciable heating.

The product disintegrates rapidly and at the end of half an hour the solution is tested to determine whether the reaction has been completed. The solution is then filtered and washed with cooled, boiled water in a non-oxidizing atmosphere, for example, an atmosphere of argon.

The precipitate is an insoluble substance containing all the trivalent rare earths and retaining a little samarium.

The filtrate is a very dark, violet-colored solution containing the greater part of the samarium (and the europium to the extent to which it was present in the raw material) and being free from trivalent earths.

Hydrogen peroxide is added to the filtrate which oxidizes the divalent compounds to the trivalent state and causes their precipitation in the form of hydroxides or hydrated oxides in trivalent condition. Any alkaline earth metal compound or compounds present in the solution will remain in solution.

The precipitate is recovered with a filter and, if necessary, the samarium and the europium are separated by known methods.

In one test, 70% of the samarium initially present in the mixture was obtained in a very pure state.

This method of application is particularly suitable for obtaining in pure state, elements capable of being reduced (Sm, Eu, Yb).

*Example B.*—Into a closed receptacle are introduced 4 liters of cooled, boiled water, 400 grams of ammonium sulfate, and 300 ml. of 12 N ammonia. The air is expelled by nitrogen and 1 kg. of reduced oxides mass obtained by electrolysis as described above, containing barium chloride and about 20% samarium chloride is added quickly with agitation. The mass was previously crushed and protected from harmful oxidation.

A sufficient quantity of ice is added to prevent appreciable heating.

The product splits up quickly and after half an hour, it must be ascertained if the reaction is completed. Also, the solution is tested to make certain that an excess of $SO_4$ ion is present. No violet color should be visible in the solution. A precipitate of barium sulfate and red samarium sulfate is visible. If a deficiency of $SO_4$ ion is noted, ammonium sulfate is added to insure an excess of sulfate.

Then about 2400 liters of 3 N hydrochloric acid is introduced a little at a time, always with ice, until the pH of the solution is about 1, whereby the trivalent hydroxides dissolve.

Filtering can then be effected even in the presence of air. After washing in cooled, boiled water, the precipitate is an insoluble mass containing barium sulfate, samarium sulfate and europium sulfate, if the raw material contained any. This insoluble mass usually also contains oxychlorides prejudicial to its purity.

The filtrate is a solution of trivalent rare earth chlorides, largely freed from reducible rare earths.

Under some conditions, more than 80% of the samarium originally contained in the mixture of chlorides used is separated.

The precipitate is treated with hydrochloric acid, barium chloride and hydrogen peroxide to oxidize the divalent rare earth compounds to the trivalent state and dissolve them.

After filtration, a solution of samarium trichloride, and europium trichloride, if present, is obtained which may be purified in the known way and to produce samarium of up to 80% purity.

Examples A and B were carried out with a mixture of rare earths obtained by treatment of monazite in which samarium is by far the most abundant reducible element, but it is apparent that the process can be used for all rare earth mixtures containing one or more of the reducible rare earth elements (Sm, Eu, Yb).

*Example C.*—A solution containing 40 gr./l. (expressed in oxides) of europium and samarium trichlorides was treated by reduction on a Jones column with zinc amalgam and introduced into an ammonia solution containing an excess of ammonia in a non-oxidizing atmosphere. Only the europium dissolved. The samarium, not being reduced under these conditions, precipitates in trivalent state with the other rare earths.

A very pure precipitate of hydrated europium oxide is recovered by oxidizing with peroxide of hydrogen and filtering.

The operation can be repeated until the desired degree of purity is obtained.

From the preceding description it will be clear that processes have been provided for separating the reducible rare earths from the non-reducible rare earths with simple equipment and in an efficient and effective way. The methods are susceptible to considerable modification as indicated herein and thus the invention is not limited save as by the terms of the following claims.

We claim:

1. In a method of effecting at least partial separation of at least one member selected from the group consisting of samarium, europium, and ytterbium from at least one rare earth other than said member in a mixture of said member and said other rare earth, said member being present in an aqueous solution as its divalent salt, and said other rare earth being present in the same solution as its trivalent salt, the step of treating said solution with an excess of ammonia in a non-oxidizing atmosphere, thereby precipitating said trivalent rare earth as its trivalent hydroxide and thereafter separating said precipitated trivalent hydroxide from said member.

2. The method set forth in claim 1 in which an oxidizing agent is added to the solution from which said trivalent hydroxides have been separated to convert said member to an insoluble trivalent hydroxide.

3. A method of effecting at least partial separation of at least one member selected from the group consisting of samarium, europium, and ytterbium from at least one rare earth other than said member in a mixture of trivalent chlorides of said member and said other rare earth, comprising subjecting said mixture to reducing conditions, whereby at least a portion of said member is reduced to the divalent state, treating the resulting mixture with an aqueous solution of ammonia and ammonium chloride in the absence of air and in the presence of ice whereby said member is converted to a soluble salt and said other rare earth is converted to an insoluble hydroxide, and thereafter separating said member from said other rare earth.

4. A method according to claim 3, wherein said mixture of chlorides is reduced while in the molten state, and thereafter cooled, crushed, and introduced into said solution.

5. In a method of effecting at least partial separation of at least one member selected from the group consisting of samarium, europium, and ytterbium from at least one rare earth other than said member in a mixture of said member and said other rare earth, said member being present in an aqueous solution as its divalent chloride, and said other rare earth being present in the same solution as its trivalent chloride, the steps of treating said solution with an excess of ammonia in a non-oxidizing atmosphere, thereby precipitating said trivalent rare earth as its trivalent hydroxide and thereafter separating said precipitated trivalent hydroxide from said member.

References Cited in the file of this patent

Krumholz et al., "Proceedings of the International Conference on the Peaceful Uses of Atomic Energy," vol. 28, 1958, pages 184–195 (pages 193 and 195 of particular interest).

Vickery, "Chemistry of the Lanthanons," Academic Press, Inc., New York, 1953, pages 105 and 252.

Yost et al., "The Rare Earth Elements and Their Compounds," John Wiley and Sons, Inc., 1947, pages 1, 40, 58 and 67.